US008517877B2

(12) United States Patent
Ishikawa et al.

(10) Patent No.: US 8,517,877 B2
(45) Date of Patent: Aug. 27, 2013

(54) HYDRAULIC CONTROL APPARATUS FOR AUTOMATIC TRANSMISSION (75) Inventors: Tomomi Ishikawa, Okazaki (JP); Tetsuya Shimizu, Anjo (JP); Kazunori Ishikawa, Toyota-chi (JP)

(73) Assignee: Aisin AW Co., Ltd., Aichi-ken (JP)

( * ) Notice: Subject to any disclaimer, the term of this patent is extended or adjusted under 35 U.S.C. 154(b) by 440 days.

(21) Appl. No.: 12/882,777

(22) Filed: Sep. 15, 2010

(65) Prior Publication Data

US 2011/0073196 A1 Mar. 31, 2011

(30) Foreign Application Priority Data

Sep. 30, 2009 (JP) ................................. 2009-228739

(51) Int. Cl.
*F16H 31/00* (2006.01)

(52) U.S. Cl.
USPC .......................................... 475/127; 477/162

(58) Field of Classification Search
USPC ................. 475/127, 130; 477/156, 158, 162, 477/163, 164
See application file for complete search history.

(56) References Cited

U.S. PATENT DOCUMENTS

| 3,494,223 | A | * | 2/1970 | Mori | 477/62 |
| 5,833,573 | A | * | 11/1998 | Inuzuka et al. | 477/143 |
| 6,171,211 | B1 | * | 1/2001 | Ortmann et al. | 477/62 |
| 6,929,584 | B2 | * | 8/2005 | Miyata et al. | 477/119 |
| 2005/0064982 | A1 | | 3/2005 | Kaizu et al. | |
| 2006/0111207 | A1 | * | 5/2006 | Ogata et al. | 474/28 |

FOREIGN PATENT DOCUMENTS

| EP | 1 517 067 A2 | 3/2005 |
| JP | 2000-130574 A | 5/2000 |
| JP | 2005-090665 A | 4/2005 |
| JP | 2007-271058 A | 10/2007 |

* cited by examiner

*Primary Examiner* — Justin Holmes
*Assistant Examiner* — Huan Le
(74) *Attorney, Agent, or Firm* — Sughrue Mion, PLLC (57) ABSTRACT A hydraulic control apparatus including a gain switch section switching a gain of a line pressure adjustment valve between a first range gain that is less than 1 and a second range gain that is greater than or equal to 1, and a source pressure switching valve switching a source pressure for a working pressure adjustment valve that outputs the control pressure for the line pressure adjustment valve between the line pressure and a modulator pressure is disclosed. The source pressure switching valve switches the source pressure for the working pressure adjustment valve to the line pressure when the gain switching section switches the gain of the line pressure adjustment valve to the first range gain, and switches the source pressure for the working pressure adjustment valve to the modulator pressure when the gain switching section switches the gain of the line pressure adjustment valve to the second range gain.

8 Claims, 4 Drawing Sheets

| | C-1 | C-2 | C-3 | B-1 | B-3 | F-2 |
|---|---|---|---|---|---|---|
| 1ST | O | | | | (O) | O |
| 2ND | O | | | O | | |
| 3RD | O | O | | | | |
| 4TH | | O | | O | | |
| REV | | | O | | O | |

(O) : ENGINE BRAKE IN OPERATION

FIG. 4A $$\text{D RANGE GAIN} = \frac{A_1}{A_2} < 1$$

$$\text{R RANGE GAIN} = \frac{A_1}{A_3} > 1$$

FIG. 4B

HYDRAULIC CONTROL APPARATUS FOR AUTOMATIC TRANSMISSION

INCORPORATION BY REFERENCE

The disclosure of Japanese Patent Application No. 2009-228739 filed on Sep. 30, 2009 including the specification, drawings and abstract is incorporated herein by reference in its entirety.

BACKGROUND OF THE INVENTION

The present invention relates to a hydraulic control apparatus for an automatic transmission mounted on vehicles such as passenger cars and trucks, for example.

DESCRIPTION OF THE RELATED ART

In an automatic transmission mounted on a vehicle, in general, a regulator valve such as a primary regulator valve adjusts an oil pressure produced by an oil pump to a line pressure serving as a source pressure for various hydraulic control apparatuses. Such a pressure adjustment valve normally adjusts the line pressure on the basis of a pilot pressure from a dedicated linear solenoid valve.

In recent years, there has been devised a hydraulic control apparatus for a toroidal continuously variable transmission including an input disc, an output disc, and a power roller held between both the discs to enable shifting through position control of the power roller, in which a plurality of pilot shuttle check valves are provided hierarchically, and the maximum working pressure, among working pressures adjusted by a plurality of linear solenoid valves for shifting as engagement pressures for friction engagement elements, is fed to a primary regulator valve to use the maximum working pressure as the pilot pressure (see Japanese Patent Application Publication No. JP-A-2007-271058, for example).

That is, each of the pilot shuttle check valves includes two input ports, one output port, and a check ball to which working pressures are input oppositely from the input ports so that the check ball is moved by a pressure difference to block an input port at a lower pressure and to communicate an input port at a higher pressure and the output port with each other, and the hydraulic control apparatus combines the pilot shuttle check valves so as to input the maximum working pressure, among the plurality of working pressures, to the regulator valve and to adjust the oil pressure produced by the oil pump such that the line pressure is higher than the maximum working pressure by a predetermined pressure.

SUMMARY OF THE INVENTION

When the maximum working pressure among the working pressures adjusted by the plurality of linear solenoid valves is used as the pilot pressure (control pressure) for the primary regulator valve, there is no need for a dedicated solenoid valve that controls the primary regulator valve, which makes it possible to reduce the number of component parts and the size. Because high working pressures may be required of the linear solenoid valves which adjust the engagement pressures for the friction engagement elements during shifting, the linear solenoid valves are supplied with the line pressure as the source pressure. However, when the valve is locked in an open state to disable control of the working pressure (hereinafter "stuck open"), the line pressure is directly output to the regulator valve as the pilot pressure.

In this event, if the gain (ratio of variations in output pressure (line pressure) to variations in pilot pressure) of the regulator valve is 1 or more, the regulator valve operates to raise the current line pressure to be higher than the line pressure input as the pilot pressure, which may raise the line pressure infinitely while the oil pump is rotating.

It is therefore an object of the present invention to provide a hydraulic control apparatus for an automatic transmission that addresses the foregoing issue by using a modulator pressure as the source pressure for a working pressure adjustment valve that outputs a pilot pressure when the gain of a primary regulator valve is 1 or more.

The present invention provides a hydraulic control apparatus for an automatic transmission according to a first aspect, including an oil pressure generation source, a line pressure adjustment valve that adjusts an oil pressure of the oil pressure generation source to a line pressure, a modulator pressure adjustment valve that adjusts the line pressure to a modulator pressure that is constant and lower than the line pressure, a plurality of working pressure adjustment valves that adjust the line pressure to respective working pressures and that directly supply the working pressures to respective hydraulic servos for a plurality of friction engagement elements, and a maximum pressure feed circuit that feeds to the line pressure adjustment valve a maximum working pressure among the working pressures adjusted by the plurality of working pressure adjustment valves, the line pressure adjustment valve using the working pressure from the maximum pressure feed circuit as a control pressure to adjust the line pressure on the basis of the control pressure. The hydraulic control apparatus includes: a gain switching section that switches a gain of the line pressure adjustment valve between 1 or more and less than 1; and a source pressure switching valve that switches a source pressure for the working pressure adjustment valve that outputs the control pressure for the line pressure adjustment valve between the line pressure and the modulator pressure. In the hydraulic control apparatus, the source pressure switching valve switches the source pressure for the working pressure adjustment valve to the line pressure when the gain switching section switches the gain of the line pressure adjustment valve to less than 1, and the source pressure switching valve switches the source pressure for the working pressure adjustment valve to the modulator pressure when the gain switching section switches the gain of the line pressure adjustment valve to 1 or more.

In addition, according to a second aspect, the gain switching section may be a range switching valve to which the line pressure is input and which outputs the line pressure as a forward range pressure or a reverse range pressure in accordance with a range position, and the gain of the line pressure adjustment valve may be switched to less than 1 by causing the forward range pressure to act on the line pressure adjustment valve when the range position is a forward range, and the gain of the line pressure adjustment valve may be switched to 1 or more when the range position is a reverse range.

Further, according to a third aspect, the line pressure adjustment valve may adjust the line pressure on the basis of the maximum working pressure fed by the maximum pressure feed circuit in a forward range period, and adjust, in a reverse range period, the line pressure on the basis of a working pressure input from a specific working pressure adjustment valve among the plurality of working pressure adjustment valves.

According to a fourth aspect, the source pressure switching valve may be interposed between the specific working pressure adjustment valve and respective hydraulic servos for a first friction engagement element and a second friction engagement element which are supplied with a working pressure from the specific working pressure adjustment valve, and the source pressure switching valve may selectively supply the working pressure from the specific working pressure adjustment valve to the hydraulic servos for the first friction engagement element and the second friction engagement element.

Further, according to a fifth aspect, the second friction engagement element may be a friction engagement element to be engaged during reverse travel, and the hydraulic control apparatus may further include a working pressure switching valve that is interposed between the hydraulic servo for the second friction engagement element and the source pressure switching valve and that is switched to supply the hydraulic servo for the second friction engagement element with the working pressure from the specific working pressure adjustment valve in the forward range period and to directly supply the hydraulic servo for the second friction engagement element with the reverse range pressure from the range switching valve in the reverse range period.

According to a sixth aspect, the hydraulic control apparatus may further include a control valve that adjusts a signal pressure for switching the working pressure switching valve and that uses the modulator pressure adjusted by the modulator pressure adjustment valve as a source pressure for the signal pressure.

According to the first aspect, the line pressure is used as the source pressure for the working pressure adjustment valve that adjusts the pilot pressure for the line pressure adjustment valve when the gain of the line pressure adjustment valve is less than 1, and the source pressure switching valve switches the source pressure for the working pressure adjustment valve to the modulator pressure when gain switching section switches the gain of the line pressure adjustment valve to 1 or more. Thus, even if the working pressure adjustment valve is stuck open when the gain of the line pressure adjustment valve is 1 or more, a pressure that is higher than the modulator pressure, which is lower than the line pressure by a predetermined pressure, is not output to the regulator valve as the pilot pressure, which prevents the line pressure from being raised infinitely without being decreased by the regulator valve.

According to the second aspect, the gain of the line pressure adjustment valve is switched to less than 1 in the forward range period, and switched to 1 or more in the reverse range period. Thus, the line pressure can be set to be high during reverse travel, in which a friction engagement element with a high torque capacity is used and therefore a high line pressure is required compared to forward travel.

According to the third aspect, the line pressure adjustment valve adjusts the line pressure on the basis of the working pressure input from the specific working pressure adjustment valve during reverse travel. Thus, the maximum pressure feed circuit infrequently switches between the working pressures during reverse travel compared to forward travel, which prevents the line pressure from being temporarily reduced due to switching of the control pressure.

According to the fourth aspect, the source pressure switching valve is also used as a relay valve that selectively supplies the working pressure from the specific working pressure adjustment valve to the hydraulic servos for the first friction engagement element and the second friction engagement element. Thus, it is possible to reduce the number of valves and hence the number of component parts.

According to the fifth aspect, the working pressure switching valve is interposed between the specific working pressure adjustment valve and the hydraulic servo for the second friction engagement element so that the R range pressure, rather than the working pressure from the specific working pressure adjustment valve which uses the modulator pressure as the source pressure, is directly output from the range switching valve to the hydraulic servo for the second friction engagement element during reverse travel, for which a high engagement pressure is necessary compared to forward travel. Thus, the second friction engagement element can be engaged reliably.

According to the sixth aspect, the modulator pressure which is the source pressure for the control valve which switches the working pressure switching valve, is also used as the source pressure for the specific working pressure adjustment valve. Thus, the modulator pressure adjustment valve can be used for both the control valve and the specific working pressure adjustment valve, which reduces the number of component parts and the size of the hydraulic control apparatus.

DETAILED DESCRIPTION OF THE EMBODIMENT

Figure 1:
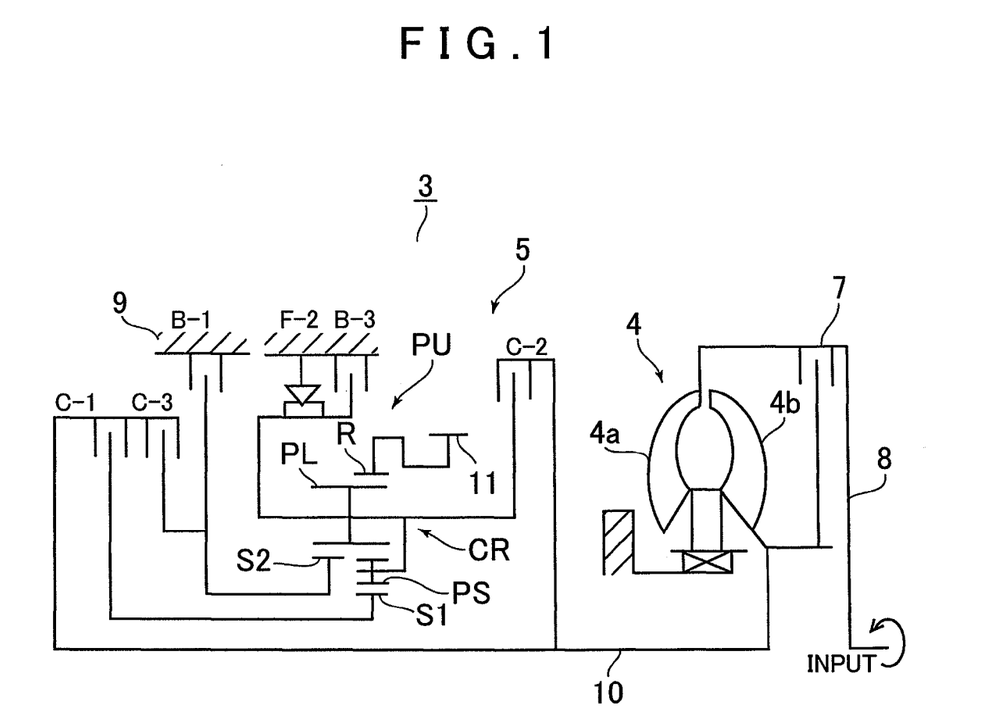
FIG. 1 is a skeleton diagram showing an automatic transmission according to the present invention.

An embodiment of the present invention will be described below with reference to FIGS. 1 to 3.

[Schematic Configuration of Automatic Transmission]

First, a schematic configuration of an automatic transmission to which the present invention is applicable will be described. As shown in FIG. 1, an automatic transmission 3, which is suitable for use in FF (front-engine front-drive) vehicles, for example, includes an input shaft 8 connectable to an engine, and a torque converter 4 and an automatic speed change mechanism 5 centered on the axis of the input shaft 8.

The torque converter 4 includes a pump impeller 4a connected to the input shaft 8 of the automatic transmission 3, and a turbine runner 4b to which rotation of the pump impeller 4a is transferred via a hydraulic fluid. The turbine runner 4b is connected to an input shaft 10 of the automatic speed change mechanism 5 disposed coaxially with the input shaft 8. The torque converter 4 further includes a lock-up clutch 7. When the lock-up clutch 7 is engaged, rotation of the input shaft 8 of the automatic transmission 3 is directly transferred to the input shaft 10 of the automatic speed change mechanism 5.

The automatic speed change mechanism 5 includes a planetary gear unit PU provided on the input shaft 10. The planetary gear unit PU is a so-called Ravigneaux type planetary gear, which includes four rotary elements, namely a sun gear S1, a sun gear S2, a carrier CR, and a ring gear R. In the planetary gear unit PU, the carrier CR includes a long pinion PL meshed with the sun gear S2 and the ring gear R and a short pinion PS meshed with the sun gear S1 in a manner such that the long pinion PL and the short pinion PS mesh with each other.

The sun gear S2 of the planetary gear unit PU is connected to a brake B-1 so as to be selectively fixed with respect to a transmission case 9. The sun gear S2 is also connected to a clutch C-3 so as to selectively receive rotation of the input shaft 10 via the clutch C-3. The sun gear S1 is connected to a clutch C-1 so as to selectively receive rotation of the input shaft 10.

The carrier CR is connected to a clutch (first friction engagement element) C-2, to which rotation of the input shaft 10 is input, so as to selectively receive rotation of the input shaft 10 via the clutch C-2. The carrier CR is also connected to a one-way clutch F-2 and a brake (second friction engagement element) B-3 so as to be restricted from rotating in one direction with respect to the transmission case 9 via the one-way clutch F-2 and so as to be selectively fixed (unrotatable) via the brake B-3. The ring gear R is connected to a counter gear 11. The counter gear 11 is connected to drive wheels via a counter shaft and a differential device (not shown).

Figure 2A:
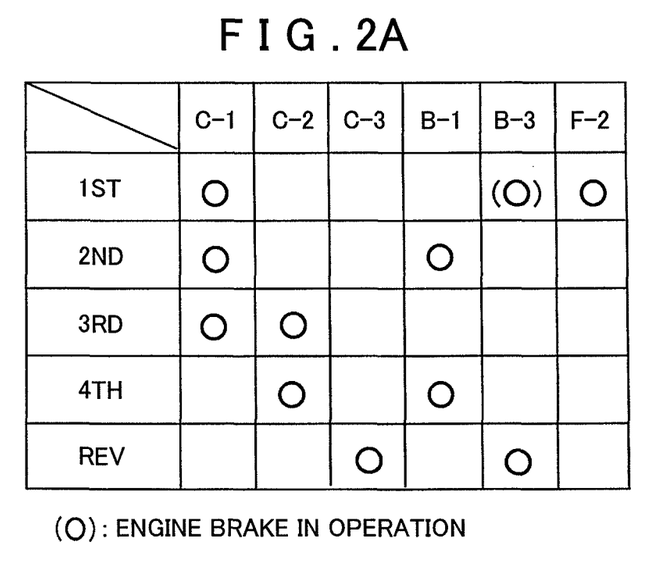
FIG. 2A is an engagement table of the automatic transmission according to the present invention.
Figure 2B:
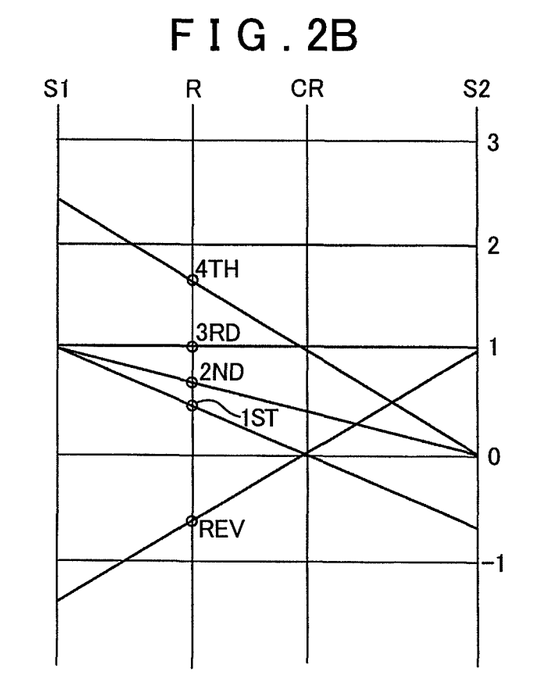
FIG. 2B is a velocity diagram of the automatic transmission according to the present invention.

FIGS. 2A and 2B show operation tables of the automatic transmission and a velocity diagram of the automatic transmission at each shift speed. In the automatic transmission 1, the clutches and the brakes are operated in combinations defined in the operation table to establish each of first to fourth forward speeds and a first reverse speed.

[Configuration of Hydraulic Control Apparatus]

Next, a hydraulic control apparatus 1 for the automatic transmission according to the present invention will be described. In the embodiment, in order to describe the position of each spool, the terms "right-half position" and "left-half position" are used to refer to the respective positions of the right half and the left half of each spool shown in FIG. 3. While a line pressure output from a manual valve (gain switching section, range switching valve) in a forward range (D range) and a line pressure output from the manual valve in a reverse range (R range) are conveniently referred to as a forward range pressure (D range pressure) and a reverse range pressure (R range pressure), respectively, for differentiation from each other, both the terms refer to the line pressure.

Figure 3:
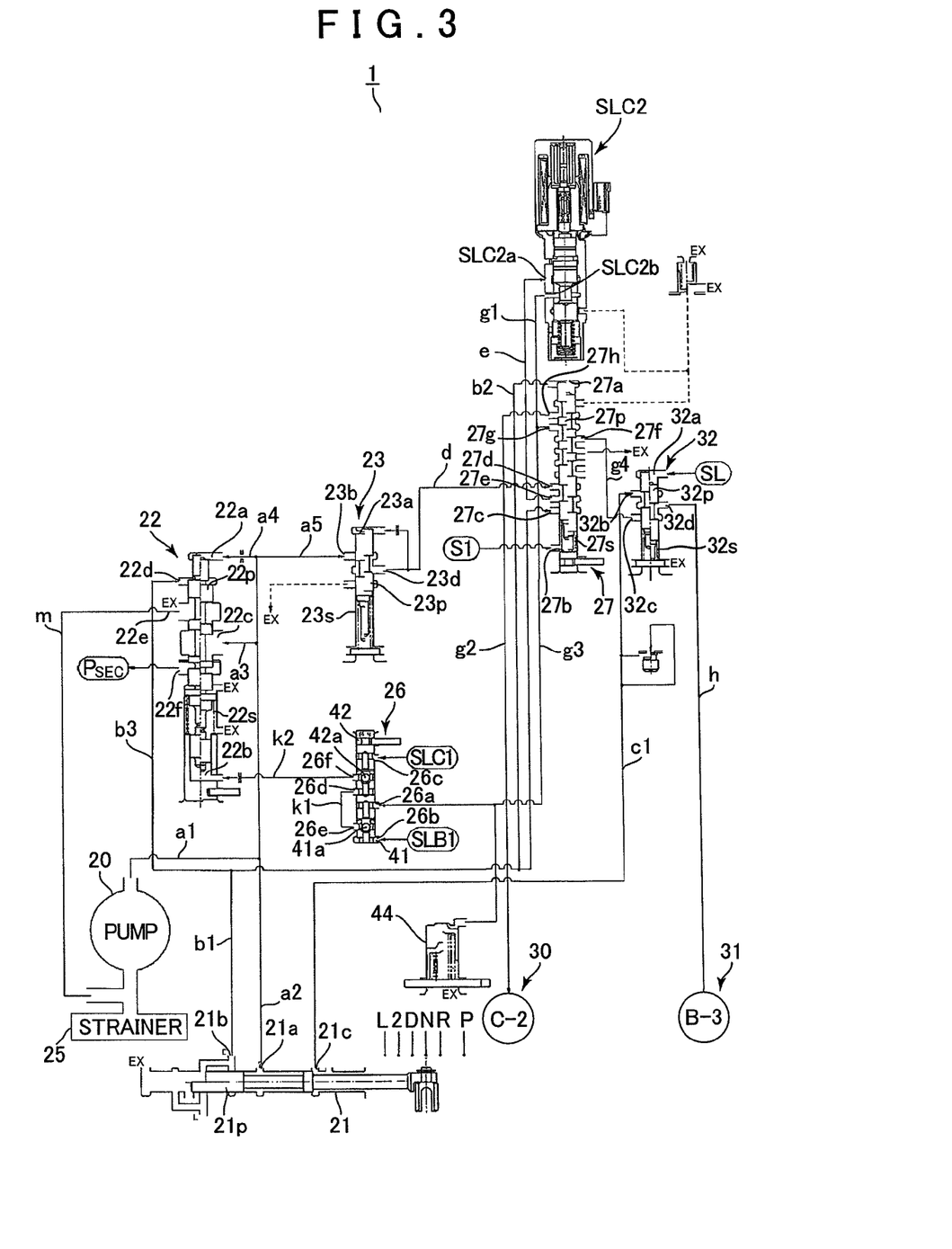
FIG. 3 is a circuit diagram showing a hydraulic control apparatus for the automatic transmission according to the present invention.

As shown in FIG. 3, the hydraulic control apparatus 1 includes an oil pump (oil pressure generation source) 20, a manual valve 21, a primary regulator valve (line pressure adjustment valve) 22, a solenoid modulator valve (modulator pressure adjustment valve) 23, and so forth. When the engine is started, the oil pump 20 drivably coupled to the pump impeller 4a of the torque converter 4 (see FIG. 1) is driven in conjunction with rotation of the engine to produce an oil pressure by suctioning oil from an oil pan via a strainer 25.

The oil pressure produced by the oil pump 20 is adjusted to a line pressure $P_L$ with discharge adjustment performed by the primary regulator valve 22 on the basis of a pilot pressure (control pressure) $P_{SIG}$ from a signal check valve (maximum pressure feed circuit) 26 to be discussed in detail later, and is supplied to the manual valve 21 and the solenoid modulator valve 23 via oil passages a2 and a5, respectively.

The solenoid modulator valve 23 includes a spool 23p, a spring 23s that urges the spring 23p upward in the drawing, an oil chamber 23a formed above the spool 23p in the drawing, an input port 23b, an output port 23d, and a drain port EX. The oil passage a5 is connected to the input port 23b to input the line pressure $P_L$ to the input port 23b.

In the solenoid modulator valve 23, when the spool 23p is moved to the right-half position by an urging force of the spring 23s, the input port 23b and the output port 23d are communicated with each other. Also, when an oil pressure output from the output port 23d is fed back to the oil chamber 23a to move the spool 23p to the left-half position, communication between the input port 23b and the output port 23d is blocked, and the output port 23d and the drain port EX are communicated with each other. This allows the solenoid modulator valve 23 to adjust the line pressure $P_L$ to a modulator pressure $P_{MOD}$, which is a pressure that is generally constant and lower than the line pressure $P_L$. The modulator pressure $P_{MOD}$ is supplied to a solenoid valve (control valve) SL via an oil passage (not shown) as a source pressure, and is input to an input port 27d of a C-2 relay valve (source pressure switching valve) 27 via an oil passage d.

The manual valve 21 includes a spool 21p mechanically (or electrically) driven by a shift lever provided in a driver's seat (not shown). Whether the line pressure $P_L$, which is input to an input port 21a via the oil passage a2, is output or not output (drained) is determined by changing the position of the spool 21p in accordance with a shift range (for example, P, R, N, or D) selected using the shift lever.

More specifically, when the range position is changed to the forward range (D range) on the basis of an operation of the shift lever, the input port 21a is communicated with a forward range pressure output port 21b on the basis of the position of the spool 21p so that the line pressure $P_L$ is output from the forward range pressure output port 21b as a D range pressure $P_D$. Also, when the range position is changed to the reverse range (R range) on the basis of an operation of the shift lever, the input port 21a is communicated with a reverse range pressure output port 21c on the basis of the position of the spool 21p so that the line pressure $P_L$ is output from the reverse range pressure output port 21c as a reverse range pressure (R range pressure) $P_{REV}$. Further, when the range position is changed to the P range or the N range on the basis of an operation of the shift lever, the spool 21p blocks communication between the input port 21a and the forward range pressure output port 21b and the reverse range pressure output port 21c, and the forward range pressure output port 21b and the reverse range pressure output port 21c are communicated with a drain port EX. That is, non-output state is established in which the D range pressure $P_D$ and the R range pressure $P_{REV}$ are drained (discharged).

Then, a section that performs speed change control will be described. The hydraulic control apparatus 1 includes a total of five hydraulic servos, namely a hydraulic servo (not shown) for the clutch C-1, a hydraulic servo (not shown) for the brake B-1, a hydraulic servo 30 for the clutch C-2, a hydraulic servo 31 for the brake B-3, and a hydraulic servo (not shown) for the clutch C-3. The hydraulic servo for the clutch C-1, the hydraulic servo for the brake B-1, and the hydraulic servo 31 for the clutch C-2, which are engaged only during forward travel, are respectively supplied with working pressures adjusted by linear solenoid valves SLC1, SLB1, and SLC2 as engagement pressures, and the hydraulic servo for the clutch C-3, which is used during reverse travel, is directly supplied with the R range pressure $P_{REV}$.

Also, the hydraulic servo 31 for the brake B-3 is supplied with either a working pressure $P_{SLC2}$ adjusted by the linear solenoid valve (specific working pressure adjustment valve) SLC2 or the R range pressure $P_{REV}$ as an engagement pressure $P_{B3}$. The hydraulic control apparatus 1 includes a B-3 relay valve (working pressure switching valve) 32 and the solenoid valve SL as a section that switches the engagement pressure between the working pressure $P_{SLC2}$ and the R range pressure $P_{REV}$.

As shown in FIG. 3, oil passages b1, b2, and b3 are connected to the forward range pressure output port 21b of the manual valve 21 to receive the forward range pressure $P_D$.

The oil passage d receives the modulator pressure $P_{MOD}$ from the solenoid modulator valve 23. The oil passage b1 and the oil passage d are respectively connected to an input port 27c and the input port 27d of the C-2 relay valve 27 to be discussed in detail later. The D range pressure $P_D$ and the modulator pressure $P_{MOD}$ respectively input via the input port 27c and the input port 27d are selectively output from an output port 27e of the C-2 relay valve 27 to an oil passage e.

The linear solenoid valve SLC2 includes an input port SLC2a, to which the D range pressure $P_D$ or the modulator pressure $P_{MOD}$ is input via the oil passage e, and an output port SLC2b, from which the working pressure $P_{SLC2}$ obtained by adjusting the D range pressure $P_D$ or the modulator pressure $P_{MOD}$ is output to the hydraulic servo 30 for the clutch C-2 or to the hydraulic servo 31 for the brake B-3 as an engagement pressure $P_{C2}$. That is, the linear solenoid valve SLC2 is configured to output the engagement pressure $P_{C2}$ or $P_{B3}$ in accordance with a command value from a control section (not shown) when energized on the basis of the command value. The output port SLC2b of the linear solenoid valve SLC2 is connected to the hydraulic servo 30 for the clutch C-2 via an oil passage g1, the C-2 relay valve 27, and an oil passage g2, and is connected to the hydraulic servo 31 for the brake B-3 via the oil passage g1, the C-2 relay valve 27, the B-3 relay valve 32, and an oil passage h.

Besides the input ports 27c and 27d and the output port 27e, the C-2 relay valve 27 additionally includes an input port 27g, output ports 27h and 27f, a drain port EX, a spool 27p, and a spring 27s that urges the spool 27p upward. The C-2 relay valve 27 further includes an oil chamber 27a formed above the spool 27p in the drawing, and an oil chamber 27b formed below the spool 27p in the drawing.

The C-2 relay valve 27 is a relay valve (switching valve) that switches the source pressure for the linear solenoid valve SLC2 between the D range pressure $P_D$ and the modulator pressure $P_{MOD}$, and that switches between the hydraulic servo 30 for the clutch C-2 and the hydraulic servo 31 for the brake B-3 for selectively supplying the working pressure $P_{SLCS}$ from the linear solenoid valve SLCS thereto. When the D range pressure $P_D$ is supplied to the oil chamber 27a via the oil passage b2 to move the spool 27p to the right-half position, the input port 27c and the output port 27e are communicated with each other so that the D range pressure $P_D$ is supplied to the input port SLC2a of the linear solenoid valve SLC2 as the source pressure. At the same time, the input port 27g and the output port 27h are communicated with each other so that the output port SLC2b of the linear solenoid valve SLC2 and the hydraulic servo 30 for the clutch C-2 are communicated with each other via the oil passage g2.

Meanwhile, when a signal pressure $P_{S1}$ from the solenoid valve S1 is input to the oil chamber 27b to move the spool 27p to the left-half position, communication between the input port 27c and the output port 27e is blocked, and the input port 27d and the output port 27e are communicated with each other so that the modulator pressure $P_{MOD}$ is supplied to the input port SLC2a of the linear solenoid valve SLC2 as the source pressure. At the same time, communication between the input port 27g and the output port 27h is blocked, and the input port 27g and the output port 27f are communicated with each other.

The B-3 relay valve 32 includes a spool 32p, a spring 32s that urges the spool 32p upward, and an oil chamber 32a which is formed above the spool 32p and to which a signal pressure $P_{SL}$ is input from the solenoid valve SL. The B-3 relay valve 32 further includes an input port 32c, an input port 32b, and an output port 32d. The input port 32c is connected to the output port 27f of the C-2 relay valve 27 via an oil passage g4. The input port 32b is connected to the reverse range pressure output port 21c of the manual valve 21 via an oil passage c1. The output port 32d is connected to the hydraulic servo 31 for the brake B-3 via the oil passage h.

In the B-3 relay valve 32, when the spool 32p is moved to the left-half position by an urging force of the spring 32s, the input port 32b and the output port 32d are communicated with each other so that the R range pressure $P_{REV}$ is output to the hydraulic servo 31 for the brake B-3. Meanwhile, when the signal pressure $P_{SL}$ from the solenoid valve SL is input to the oil chamber 32a to move the spool 32p to the right-half position, communication between the input port 32b and the output port 32d is blocked, and the input port 32c and the output port 32d are communicated with each other so that the control pressure $P_{SLC2}$ from the linear solenoid valve SLC2 can be output to the hydraulic servo 31 for the brake B-3.

The linear solenoid valves other than the linear solenoid valve SLC2, namely SLC1 and SLB1, are supplied with the D range pressure $P_D$ as the source pressure through oil passages (not shown).

Then, a detailed configuration of a line pressure adjustment section that adjusts the line pressure will be described. As discussed above, the oil pressure produced by the oil pump 20 is adjusted to the line pressure $P_L$ by the primary regulator valve 22 on the basis of the pilot pressure $P_{SIG}$ from the signal check valve 26. The line pressure adjustment section includes the primary regulator valve 22, the signal check valve 26, the linear solenoid valves SLC1, SLB1, and SLC2, the manual valve 21, and so forth. The linear solenoid valves SLC1, SLB1, and SLC2 adjust respective working pressures (engagement pressures) serving as the source pressure for the signal pressure $P_{SIG}$ of the signal check valve 26.

The signal check valve 26 includes a first shuttle valve 41 and a second shuttle valve 42 provided integrally at the same position (in the same hole) of the hydraulic control apparatus (control valve) 1 and combined hierarchically. The signal check valve 26 further includes four input ports 26a, 26b, 26c, and 26d and two output ports 26e and 26f. Each of the first and second shuttle valves 41 and 42 includes two input ports and one output port, and is configured such that the output port is communicated with an input port at the maximum pressure. Thus, the final output port 26f of the signal check valve 26 is communicated with an input port at the highest pressure among the input ports 26a, 26b, 26c, and 26d. The first and second shuttle valves 41 and 42 are not necessarily disposed at the same position of the hydraulic control apparatus 1, and may be disposed at any position on an oil pressure circuit as long as the first and second shuttle valves 41 and 42 are combined hierarchically.

The first shuttle valve 41 includes the input port 26a, the input port 26b, and the output port 26e. The input port 26a is supplied with the engagement pressure $P_{C2}$ (working pressure $P_{SLC2}$) for the clutch C-2 via an oil passage g3 to which a C-2 damper 44 is coupled. The input port 26b is supplied with an engagement pressure $P_{B1}$ (working pressure $P_{SLB1}$) for the brake B-1. The engagement pressures $P_{C2}$ and $P_{B1}$ are oppositely input to a check ball 41a serving as a pressure receiving member. The check ball 41a is moved in either direction depending on the pressure difference between the engagement pressures $P_{C2}$ and $P_{B1}$ to block one of the input ports 26a and 26b at a lower oil pressure and to communicate the other of the input ports 26a and 26b at a higher oil pressure with the output port 26e.

In the same way as the first shuttle valve 41, the second shuttle valve 42 includes the input port 26c, the input port 26d, and the output port 26f. The input port 26d is connected to the output port 26e of the first shuttle valve 41 via an oil passage k1. Therefore, the input port 26d is supplied with a higher one of the engagement pressure $P_{C2}$ for the clutch C-2 and the engagement pressure $P_{B1}$ for the brake B-1. The input port 26c is supplied with the engagement pressure $P_{C1}$ (working pressure $P_{SLC1}$) for the clutch C-1. The engagement pressures $P_{C1}$ and $P_{C2}$ or $P_{B1}$ are oppositely input to a check ball 42a serving as a pressure receiving member. The check ball 42a is moved in either direction depending on the pressure difference between the engagement pressures $P_{C1}$ and $P_{C2}$ or $P_{B1}$ to block one of the input ports 26c and 26d at a lower oil pressure and to communicate the other of the input ports 26c and 26d at a higher oil pressure with the output port 26f.

Because the clutch C-1 is engaged to establish lower shift speeds which require a large drive torque as shown in FIG. 2A, the clutch C-1 is used frequently, and the engagement pressure $P_{C1}$ for the clutch C-1 is often higher than the engagement pressure $P_{C2}$ for the clutch C-2 and the engagement pressure $P_{B1}$ for the brake B-1. Therefore, in the signal check valve 26, the engagement pressure $P_{C1}$ for the clutch C-1 is input to the input port 26c of the second shuttle valve 42 so that the engagement pressure $P_{C1}$ can be output from the output port 26f as the pilot pressure $P_{SIG}$ after one comparison.

In order to prevent the check balls from being kept generally at the center to block the output ports 26e and 26f when engagement pressures at the same level are input to the input ports 26a, 26b, 26c, and 26d, the first and second shuttle valves 41 and 42 may be provided with a weak spring or the like that urges the check balls 41a and 42a to one side.

The primary regulator valve 22 to which the pilot pressure $P_{SIG}$ from the signal check valve 26 is input includes a spool 22p, a spring 22s that urges the spool 22p upward, an oil chamber 22a formed above the spool 22p in the drawing, and an oil chamber 22b formed below the spool 22p in the drawing. The primary regulator valve 22 further includes an input port 22c, an input port 22d, two drain ports 22e and 22f that discharge an excessive oil pressure from the oil pump 20, and so forth.

The input port 22c is supplied with an oil pressure (line pressure $P_L$) produced by the oil pump 20 via an oil passage a3. In the primary regulator valve 22, when the spool 22p is in the right-half position, the input port 22c and the drain ports 22e and 22f are communicated with each other so that an excessive oil pressure is discharged from the drain ports 22e and 22f to decrease the line pressure $P_L$. Meanwhile, when the spool 22p is in the left-half position, communication between the input port 22c and the drain ports 22e and 22f is blocked to raise the line pressure $P_L$. An oil pressure discharged from the drain port 22f is adjusted to a secondary pressure by a secondary regulator valve (not shown). The oil pressure discharged from the drain port 22e is refluxed to the oil pan via an oil passage m.

Figure 4A:
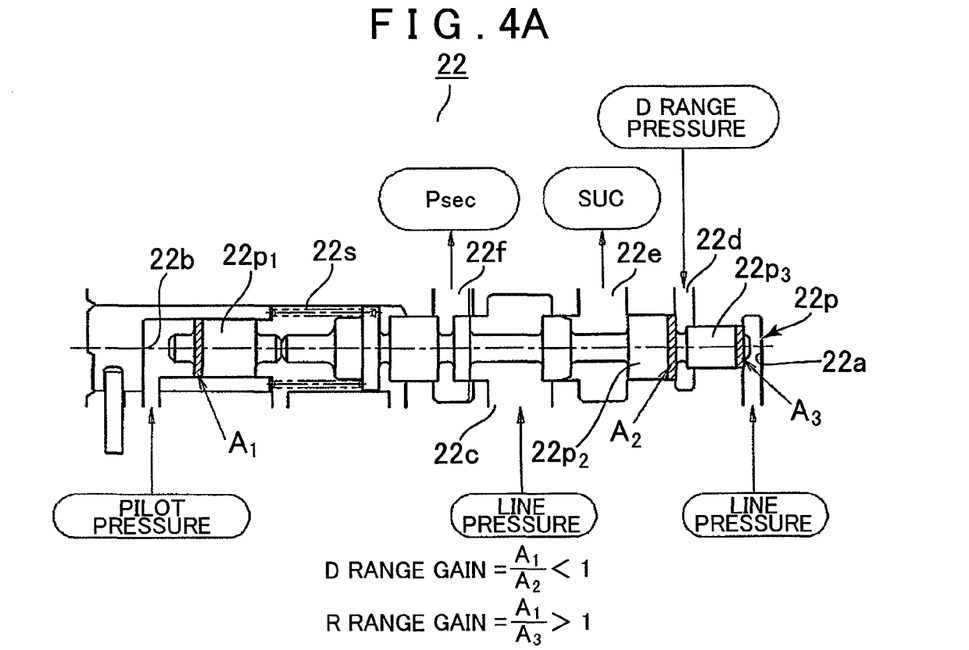
FIG. 4A is an enlarged view of a primary regulator valve according to the present invention.

As shown in FIG. 4A, the oil chamber 22a receives the line pressure $P_L$ via an oil passage a4, the oil chamber 22b receives the pilot pressure $P_{SIG}$ via an oil passage k2, and the input port 22d receives the D range pressure $P_D$ via the oil passage b3. When the pressure receiving area (first pressure receiving area) of a land portion $22p_1$ of the spool 22p on which the pilot pressure $P_{SIG}$ acts is defined as $A_1$, the urging force of the spring 22s is defined as Fs, the pressure receiving area (second pressure receiving area) of a land portion $22p_2$ of the spool 22p on which the D range pressure $P_D$ acts is defined as $A_2$, and the pressure receiving area (third pressure receiving area) of a land portion $22p_3$ of the spool 22p on which the line pressure $P_L$ acts is defined as $A_3$, an actuation force i which acts on the spool 22p toward the oil chamber 22a and actuation forces ii and iii which act on the spool 22p toward the oil chamber 22b are represented by the following formulas.

$i = P_{SIG}*A_1 + Fs$ $ii = P_D*A_2$ (D range period)

$iii = P_L*A_3$ (R range period)

That is, the spool 22p is moved such that the actuation force i toward the oil chamber 22a and the actuation force ii or iii in the direction of the actuation force 22b, which are opposite each other, are balanced against each other. In the case where the actuation force ii or iii is large compared to the actuation force i, the spool 22p is moved toward the oil chamber 22b. In the case where the actuation force ii or iii is small compared to the actuation force i, the spool 22p is moved toward the oil chamber 22a.

Also, as discussed above, the spool 22p is urged toward the oil chamber 22a by the urging force Fs of the spring 22s even when the pilot pressure $P_{SIG}$ is not output. Thus, at least a pressure corresponding to the urging force Fs is output as an initial pressure of the line pressure $P_L$.

As shown in FIG. 4A, the land portions $22p_1$, $22p_2$, and $22p_3$ of the spool 22p are formed to have different diameters such that the second pressure receiving area $A_2$ is the largest, the first pressure receiving area $A_1$ is the second largest, and the third pressure receiving area $A_3$ is the smallest ($A_2 > A_1 > A_3$). The gain, which is the ratio of the input to the output of the primary regulator valve 22, is determined by the ratio of the pressure receiving area $A_1$ for the pilot pressure $P_{SIG}$ to the pressure receiving area $A_2$ for the D range pressure $P_D$ or the pressure receiving area $A_3$ for the line pressure $P_L$. Therefore, the primary regulator valve 22 has two gains depending on whether or not the D range pressure $P_D$ is input to the input port 22d.

In other words, in the primary regulator valve 22, switching is performed using the manual valve 21 between a D range gain $G_D = A_1/A_2$ in a D range period and an R range gain $G_R = A_1/A_3$ in an R range period. The D range gain $G_D$ is set to be less than 1, and the R range gain $G_R$ is set to be 1 or more ($G_D < 1$, $G_R \geq 1$).

The gains of the primary regulator valve 22 may be switched not only when switching is performed between the D range period and the R range period but also when switching is performed in the D range period between shifting which requires a high oil pressure and normal running. Also, the gains may be switched by supplying an oil pressure to the primary regulator valve 22 using a solenoid valve rather than the manual valve 21.

Next, operation of the hydraulic control apparatus 1 according to the embodiment will be described. When ignition is turned on by a driver, for example, the hydraulic control apparatus 1 starts hydraulic control. When the engine is started, an oil pressure is produced by rotation of the oil pump 20 based on rotation of the engine. The oil pressure is input to the oil chamber 22a and the input port 22c of the primary regulator valve 22 via the oil passages a3 and a4. Consequently, the spool 22p is moved to a position at which the oil pressure supplied to the oil chamber 22a and the urging force of the spring 22s are balanced against each other, and the oil pressure produced by the oil pump 20 is adjusted to the initial pressure of the line pressure $P_L$. The line pressure $P_L$ is input to the input port 21a of the manual valve 21 via the oil passage a2, and to the input port 23b of the solenoid modulator valve 23 via the oil passage a5.

[Operation at First to Fourth Forward Speeds]

Subsequently, when the driver moves the shift lever from the N range to the D range and the control section (not shown) determines any of the first to fourth forward speeds, the forward range pressure $P_D$ is output from the forward range pressure output port 21b of the manual valve 21 to the oil passages b1 to b3.

Consequently, the D range pressure $P_D$ is supplied to the oil chamber 27a of the C-2 relay valve 27, which moves the spool 27p to the right-half position to communicate the input port 27c and the output port 27e with each other. The D range pressure $P_D$ is also input from the output port 27e to the input port SLC2a of the linear solenoid valve SLC2 as the source pressure. At the same time, movement of the spool 27p to the right-half position allows the input port 27g and the output port 27h to communicate with each other, which makes it possible to output the working pressure of the linear solenoid valve SLC2 to the hydraulic servo 30 for the clutch C-2.

The D range pressure $P_D$ is further supplied to the linear solenoid valves other than the linear solenoid valve SLC2, namely SLC1 and SLB1, as the source pressure through oil passages (not shown). The linear solenoid valves SLC1, SLC2, and SLB1 selectively output the working pressures (engagement pressures) $P_{SLC1}$, $P_{SLC2}$, and $P_{SLB1}$ to the hydraulic servos 30, 31, and so forth for the friction engagement elements C-1, C-2, B-1, and B-3 in accordance with the shift speed indicated by an electrical command from the control section to selectively engage the friction engagement elements C-1, C-2, B-1, and B-3 in accordance with the shift speed. Then, such selective engagement of the friction engagement elements C-1, C-2, B-1, and B-3 serves to establish any of the first forward speed to the fourth forward speed.

[Operation with Engine Brake in Operation at First Forward Speed]

When the control section determines that engine brake is in operation at the first forward speed, the control section issues an electrical command to output the signal pressure $P_{S1}$ from the solenoid valve S1 to the oil chamber 27b of the C-2 relay valve 27. Consequently, the spool 27p of the C-2 relay valve 27 is moved from the right-half position to the left-half position, which blocks communication between the input port 27c and the output port 27e and communicates the output port 27e and the input port 27d with each other so that the modulator pressure $P_{MOD}$ is supplied to the input port SLC2a of the linear solenoid valve SLC2 as the source pressure.

At the same time, communication between the input port 27g and the output port 27h is blocked and the input port 27g and the output port 27f are communicated with each other, as a result of which communication between the output port SLC2b of the linear solenoid valve SLC2 and the hydraulic servo 30 for the clutch C-2 is blocked.

Further, when it is determined that engine brake is in operation at the first forward speed, the signal pressure $P_{SL}$ is output from the solenoid valve SL to the oil chamber 32a of the B-3 relay valve 32, which moves the spool 32p to the right-half position to communicate the input port 32c and the output port 32d with each other. Therefore, the working pressure $P_{SLC2}$ of the linear solenoid valve SLC2 is output to the hydraulic servo 31 for the brake B-3 via the oil passage g1, the C-2 relay valve 27, the oil passage g4, the B-3 relay valve 32, and the oil passage h to engage the brake B-3.

Then, engagement of the brake B-3 and engagement of the clutch C-1 due to the working pressure $P_{SLC1}$ from the linear solenoid valve SLC1 are combined with each other to apply engine brake at the first forward speed.

[Operation of Primary Regulator Valve in D Range Period]

The working pressures (engagement pressures) $P_{SLC1}$, $P_{SLC2}$, and $P_{SLB1}$ respectively output from the linear solenoid valves SLC1, SLC2, and SLB1 are input to the input ports 26a, 26b, and 26c of the signal check valve 26, and the highest one of the working pressures $P_{SLC1}$, $P_{SLC2}$, and $P_{SLB1}$ is input to the oil chamber 22b of the primary regulator valve 22 via the oil passage k2 as the pilot pressure $P_{SIG}$.

When the pilot pressure $P_{SIG}$ is input to the oil chamber 22b, the primary regulator valve 22 adjusts the line pressure $P_L$ such that the line pressure $P_L$ is varied by a ratio based on the D range gain $G_D$. That is, the primary regulator valve 22 adjusts the line pressure $P_L$ such that the line pressure $P_L$ is varied by a value obtained by multiplying the amount of variation in pilot pressure $P_{SIG}$ by the D range gain $G_D$.

At this time, since the D range gain $G_D$ is set to a value less than 1, the amount of variation in line pressure $P_L$ is less than the amount of variation in pilot pressure $P_{SIG}$. However, since the line pressure $P_L$ has an initial pressure corresponding to the urging force of the spring 22s, the line pressure $P_L$ at least does not become lower than the pilot pressure $P_{SIG}$.

[Operation with Linear Solenoid Valve Stuck Open in D Range]

When any one of the plurality of linear solenoid valves SLC1, SLC2, and SLB1 is stuck open while the vehicle is traveling forward and the D range pressure $P_D$ as the source pressure for the linear solenoid valve is directly output to the oil chamber 22b of the primary regulator valve 22 as the pilot pressure $P_{SIG}$ via the signal check valve 26, the primary regulator valve 22 raises the line pressure $P_L$ on the basis of the D range gain $G_D$.

Figure 4B:
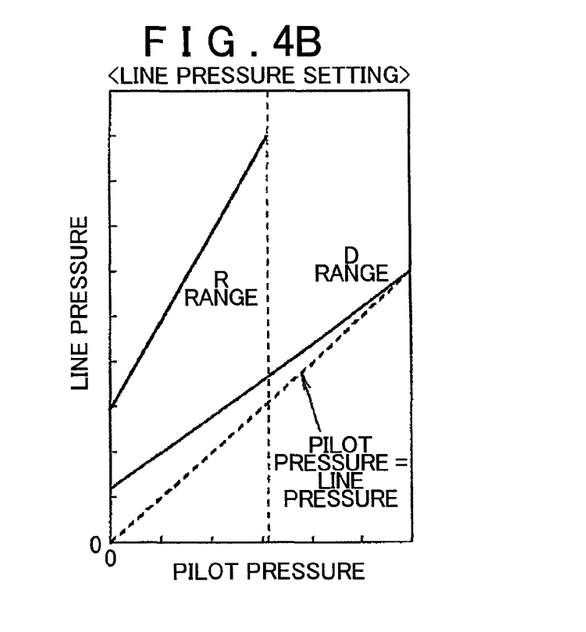
FIG. 4B is a graph showing the correlation between the line pressure and the pilot pressure for the primary regulator valve according to the present invention.

Consequently, the raised line pressure $P_L$ is output from the linear solenoid valve which is stuck open, and is output again to the oil chamber 22b of the primary regulator valve 22 as the pilot pressure $P_{SIG}$, which progressively raises the line pressure $P_L$ (see FIG. 4B). The D range gain $G_D$ of the primary regulator valve 22 is less than 1 (the amount of increase in line pressure $P_L$ is less than the amount of increase in pilot pressure $P_{SIG}$). Therefore, when the pilot pressure $P_{SIG}$ is raised to be the same level as the line pressure $P_L$, the pilot pressure $P_{SIG}$ and the line pressure $P_L$ reach an equilibrium so that the line pressure $P_L$ reaches its limit. That is, the line pressure $P_L$ is not raised to be higher than the limit.

[Operation at First Reverse Speed]

Then, when the driver operates the shift lever to the R range, the R range pressure $P_{REV}$ is output from the reverse range pressure output port 21c of the manual valve 21. The R range pressure $P_{REV}$ is also directly supplied to the hydraulic servo for the clutch C-3 via an oil passage (not shown) as an engagement pressure $P_{C3}$ to engage the clutch C-3.

Also, when a shift lever sensor detects that the shift lever is in the R range and the control section determines that the shift lever position is the R range, the solenoid valve SL is kept off and the spool 32p of the B-3 relay valve 32 is urged to the left-half position by the urging force of the spring 32s.

Consequently, in the B-3 relay valve 32, the input port 32b and the output port 32d are communicated with each other so that the R range pressure $P_{REV}$ is supplied to the hydraulic servo 31 for the brake B-3 via the oil passage h to engage the brake B-3. Engagement of the brake B-3 and the clutch C-3 serves to establish the first reverse speed.

[Operation of Primary Regulator Valve in R Range Period]

When it is determined that the shift lever position is the R range, the signal pressure $P_{S1}$ is output from the solenoid valve S1 to the oil chamber 27b of the C-2 relay valve 27 to urge the spool 27p to the left-half position. Consequently, communication between the input port 27c and the output port 27e, which are communicated in the D range, is blocked and the input port 27d and the output port 27e are communicated with each other to switch the source pressure for the linear solenoid valve SLC2 from the D range pressure $P_D$ to the modulator pressure $P_{MOD}$.

The linear solenoid valve SLC2, of which the source pressure has been switched to the modulator pressure $P_{MOD}$, adjusts the modulator pressure $P_{MOD}$ to the working pressure $P_{SLC2}$ on the basis of an electrical command from the control section to output the working pressure $P_{SLC2}$ from the output port SLC2b. During reverse travel, the D range pressure $P_D$ is not supplied to the other solenoid valves SLC1 and the SLB1 as the source pressure. Therefore, only the working pressure $P_{SLC2}$ is output to the input ports 26a, 26b, and 26c of the signal check valve 26. The working pressure $P_{SLC2}$ is output from the output port 26f of the signal check valve 26 to the oil chamber 22b of the primary regulator valve 22 as the pilot pressure $P_{SIG}$.

When the pilot pressure $P_{SIG}$ is output to the oil chamber 22b, the primary regulator valve 22 adjusts the line pressure $P_L$ such that the line pressure $P_L$ is varied by a ratio based on the R range gain $G_R$ on the basis of the pilot pressure $P_{SIG}$. That is, the line pressure $P_L$ is adjusted such that the line pressure $P_L$ is varied by a value obtained by multiplying the amount of variation in pilot pressure $P_{SIG}$ by the R range gain $G_R$.

[Operation with Linear Solenoid Valve Stuck Open in R Range]

When the linear solenoid valve SLC2 is stuck open during reverse travel and the modulator pressure $P_{MOD}$ as the source pressure for the linear solenoid valve SLC2 is directly output to the oil chamber 22b of the primary regulator valve 22 via the signal check valve 26 as the pilot pressure $P_{SIG}$, the line pressure $P_L$ is raised by an amount obtained by multiplying the modulator pressure $P_{MOD}$ by the R range gain $G_R$.

However, even if the line pressure $P_L$ is raised, the modulator pressure $P_{MOD}$ is reduced to a pressure that is generally constant and lower than the line pressure $P_L$ by the solenoid modulator valve 23. Therefore, the pilot pressure $P_{SIG}$ is not raised to the modulator pressure $P_{MOD}$ or more, and the line pressure $P_L$ is also not raised to a pressure corresponding to the modulator pressure $P_{MOD}$ or more.

In this way, the line pressure $P_L$ can be set to be higher in the R range period, in which a high engagement pressure is required, by setting the gain of the primary regulator valve 22 to less than 1 in the D range period and to 1 or more in the R range period.

In the R range period, in which the gain of the primary regulator valve 22 is 1 or more, the source pressure for the linear solenoid valve SLC2, which outputs the pilot pressure $P_{SIG}$, is switched from the D range pressure $P_D$ to the modulator pressure $P_{MOD}$ obtained by decreasing the line pressure $P_L$. Thus, even if the linear solenoid valve SLC2 is stuck open to make it impossible to adjust the working pressure, the pilot pressure $P_{SIG}$ is not raised to the modulator pressure $P_{MOD}$ or more, which prevents the line pressure $P_L$ from being raised infinitely.

In the embodiment, only the source pressure for the linear solenoid valve SLC2 is switched between the D range pressure $P_D$ and the modulator pressure $P_{MOD}$. However, the source pressures for the other linear solenoid valves SLC1 and SLB1, which possibly output the pilot pressure $P_{SIG}$ to the primary regulator valve 22, may be switched in accordance with the gain.

In the R range period, the pilot pressure $P_{SIG}$ is output from the linear solenoid valve SLC2. However, the pilot pressure $P_{SIG}$ may be output from any linear solenoid valve as long as the linear solenoid valve can output a working pressure in the R range period and the working pressure is not used to engage a friction engagement element in the R range period.

Further, in the embodiment, the hydraulic control apparatus 1 for an automatic transmission is applied to the automatic transmission 3 which establishes four forward speeds and one reverse speed. However, it is a matter of course that the present invention is not limited thereto, and the present invention may be applied to any automatic transmission that includes a primary regulator valve with a gain of 1 or more, such as an automatic transmission that establishes six forward speeds, for example.

The hydraulic control apparatus for an automatic transmission according to the present invention can be used for automatic transmissions mounted on passenger cars, trucks, buses, and so forth, and is particularly suitable for use in automatic transmissions for which it is required to reduce the number of component parts and the size.

What is claimed is:

1. A hydraulic control apparatus for an automatic transmission, including an oil pressure generation source, a line pressure adjustment valve that adjusts an oil pressure of the oil pressure generation source to a line pressure, a modulator pressure adjustment valve that adjusts the line pressure to a modulator pressure that is constant and lower than the line pressure, a plurality of working pressure adjustment valves that adjust the line pressure to respective working pressures and that directly supply the working pressures to respective hydraulic servos for a plurality of friction engagement elements, and a maximum pressure feed valve that feeds to the line pressure adjustment valve a maximum working pressure among the working pressures adjusted by the plurality of working pressure adjustment valves, the line pressure adjustment valve using the working pressure from the maximum pressure feed valve as a control pressure to adjust the line pressure on the basis of the control pressure, the hydraulic control apparatus comprising:

a gain switching section that switches a gain of the line pressure adjustment valve between 1 or more and less than 1; and a source pressure switching valve that switches a source pressure for the working pressure adjustment valve that outputs the control pressure for the line pressure adjustment valve between the line pressure and the modulator pressure, wherein the source pressure switching valve switches the source pressure for the working pressure adjustment valve to the line pressure when the gain switching section switches the gain of the line pressure adjustment valve to less than 1, and the source pressure switching valve switches the source pressure for the working pressure adjustment valve to the modulator pressure when the gain switching section switches the gain of the line pressure adjustment valve to 1 or more.

2. The hydraulic control apparatus for an automatic transmission according to claim 1, wherein the source pressure switching valve directly receives the modulator pressure from the modulator pressure adjustment valve.

3. The hydraulic control apparatus for an automatic transmission according to claim 2, wherein the source pressure switching valve directly receives the line pressure from the gain switching section.

4. The hydraulic control apparatus for an automatic transmission according to claim 1, wherein
the gain switching section is a range switching valve to which the line pressure is input and which outputs the line pressure as a forward range pressure or a reverse range pressure in accordance with a range position, and the gain of the line pressure adjustment valve is switched to less than 1 by causing the forward range pressure to act on the line pressure adjustment valve when the range position is a forward range, and the gain of the line pressure adjustment valve is switched to 1 or more when the range position is a reverse range.

5. The hydraulic control apparatus for an automatic transmission according to claim 4, wherein the line pressure adjustment valve adjusts the line pressure on the basis of the maximum working pressure fed by the maximum pressure feed circuit in a forward range period, and adjusts, in a reverse range period, the line pressure on the basis of a working pressure input from a specific working pressure adjustment valve among the plurality of working pressure adjustment valves.

6. The hydraulic control apparatus for an automatic transmission according to claim 5, wherein the source pressure switching valve is interposed between the specific working pressure adjustment valve and respective hydraulic servos for a first friction engagement element and a second friction engagement element which are supplied with a working pressure from the specific working pressure adjustment valve, and the source pressure switching valve selectively supplies the working pressure from the specific working pressure adjustment valve to the hydraulic servos for the first friction engagement element and the second friction engagement element.

7. The hydraulic control apparatus for an automatic transmission according to claim 6, wherein the second friction engagement element is a friction engagement element to be engaged during reverse travel, and the hydraulic control apparatus further comprises a working pressure switching valve that is interposed between the hydraulic servo for the second friction engagement element and the source pressure switching valve and that is switched to supply the hydraulic servo for the second friction engagement element with the working pressure from the specific working pressure adjustment valve in the forward range period and to directly supply the hydraulic servo for the second friction engagement element with the reverse range pressure from the range switching valve in the reverse range period.

8. The hydraulic control apparatus for an automatic transmission according to claim 7, further comprising:

a control valve that adjusts a signal pressure for switching the working pressure switching valve and that uses the modulator pressure adjusted by the modulator pressure adjustment valve as a source pressure for the signal pressure.

* * * * *